United States Patent
Chan et al.

(10) Patent No.: US 8,458,712 B2
(45) Date of Patent: Jun. 4, 2013

(54) SYSTEM AND METHOD FOR MULTI-LEVEL PREEMPTION SCHEDULING IN HIGH PERFORMANCE PROCESSING

(75) Inventors: Waiman Chan, Poughkeepsie, NY (US); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 12/112,462

(22) Filed: Apr. 30, 2008

(65) Prior Publication Data
US 2009/0276781 A1    Nov. 5, 2009

(51) Int. Cl.
*G06F 9/46* (2006.01)
(52) U.S. Cl.
USPC ............................ 718/103; 718/104; 718/105
(58) Field of Classification Search
None
See application file for complete search history.

(56) References Cited

U.S. PATENT DOCUMENTS

| | | | |
|---|---|---|---|
| 5,872,963 A | 2/1999 | Bitar et al. | |
| 6,021,425 A | 2/2000 | Waldron, III et al. | |
| 6,687,905 B1 | 2/2004 | Day, III et al. | |
| 6,694,345 B1 * | 2/2004 | Brelsford et al. | 718/100 |
| 6,728,792 B2 | 4/2004 | Wagner | |
| 6,895,292 B2 | 5/2005 | Fromherz et al. | |
| 6,993,762 B1 | 1/2006 | Pierre | |
| 7,082,606 B2 * | 7/2006 | Wood et al. | 718/102 |
| 7,222,343 B2 | 5/2007 | Heyrman et al. | |
| 7,480,913 B2 * | 1/2009 | Buco et al. | 718/105 |
| 7,596,788 B1 * | 9/2009 | Shpigelman | 718/100 |
| 7,650,601 B2 * | 1/2010 | Aguilar et al. | 718/104 |
| 7,920,282 B2 * | 4/2011 | Coppinger et al. | 358/1.15 |
| 7,984,447 B1 * | 7/2011 | Markov | 718/103 |
| 8,108,656 B2 * | 1/2012 | Katragadda et al. | 712/215 |

(Continued)

OTHER PUBLICATIONS

Kannan et al. (NPL: Kannan_2001.pdf), "Workload Management with LoadLeveler", Nov. 2001, IBM Redbooks, (pp. 1-228).*

(Continued)

*Primary Examiner* — Emerson Puente
*Assistant Examiner* — Hiren Paul
(74) *Attorney, Agent, or Firm* — Cantor Colburn LLP; Steven Chiu

(57) ABSTRACT

A computing system configured to handle preemption events in an environment having jobs with high and low priorities. The system includes a job queue configured to receive job requests from users, the job queue storing the jobs in an order based on the priority of the jobs, and indicating whether a job is a high priority job or a low priority job. The system also includes a plurality of node clusters, each node cluster including a plurality of nodes and a scheduler coupled to the job queue and to the plurality of node clusters and configured to assign jobs from the job queue to the plurality of node clusters. The scheduler is configured to preempt a first low priority job running in a first node cluster with a high priority job that appears in the job queue after the low priority job has started and, in the event that a second low priority job from the job queue may run on a portion of the plurality of nodes in the first node cluster during a remaining processing time for the high priority job, backfill the second low priority job into the portion of the plurality of nodes and, in the event a second high priority job is received in the job queue and may run on the portion of the plurality of nodes, return the second low priority job to the job queue.

7 Claims, 7 Drawing Sheets

U.S. PATENT DOCUMENTS

| | | | |
|---|---|---|---|
| 8,185,903 B2* | 5/2012 | Fulton et al. | 718/103 |
| 2002/0120488 A1* | 8/2002 | Bril et al. | 705/9 |
| 2002/0194248 A1* | 12/2002 | Wood et al. | 709/102 |
| 2003/0208521 A1* | 11/2003 | Brenner et al. | 709/103 |
| 2004/0015973 A1* | 1/2004 | Skovira | 718/103 |
| 2004/0199918 A1* | 10/2004 | Skovira | 718/102 |
| 2004/0236556 A1* | 11/2004 | Lin | 703/14 |
| 2005/0055697 A1* | 3/2005 | Buco et al. | 718/105 |
| 2005/0125793 A1* | 6/2005 | Aguilar et al. | 718/100 |
| 2005/0228630 A1* | 10/2005 | Tseng et al. | 703/19 |
| 2006/0218558 A1* | 9/2006 | Torii et al. | 718/107 |
| 2007/0044102 A1* | 2/2007 | Casotto | 718/103 |
| 2007/0143760 A1* | 6/2007 | Chan et al. | 718/102 |
| 2007/0220152 A1* | 9/2007 | Jackson | 709/226 |
| 2008/0027565 A1* | 1/2008 | Erva et al. | 700/1 |
| 2008/0115140 A1* | 5/2008 | Erva et al. | 718/104 |
| 2008/0178185 A1* | 7/2008 | Okada et al. | 718/103 |
| 2008/0229318 A1* | 9/2008 | Franke | 718/104 |
| 2009/0031312 A1* | 1/2009 | Mausolf et al. | 718/102 |
| 2009/0083746 A1* | 3/2009 | Katsumata | 718/103 |
| 2009/0165009 A1* | 6/2009 | Heffernan et al. | 718/103 |

OTHER PUBLICATIONS

E.G. Coffman, "On the Tradeoff Between Response and Preemption Costs in a Foreground-Background Computer Service Discipline," IEEE Transactions on Computers, vol. 18, No. 10, pp. 942-947, Oct. 1969.

* cited by examiner

|     | Job ID | Class | State | Nodes | Time (Hours) | Time in |
|-----|--------|-------|-------|-------|--------------|---------|
| 202 | J1     | LowP  | R     | 16    | 4            | 1       |
| 204 | J2     | HiP   | I     | 1     | 2            | 2       |
| 206 | J3     | LowP  | I     | 8     | 1            | 3       |
| 208 | J4     | HiP   | I     | 10    | 10           | 4       |

FIG. 2

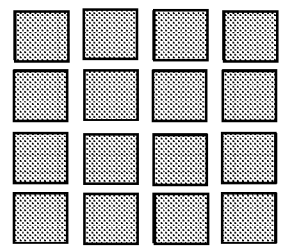
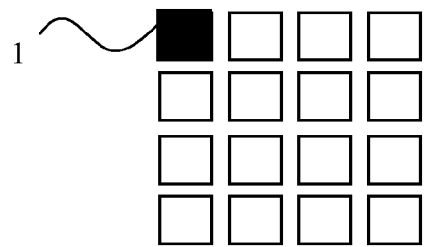
FIG. 3a
FIG. 3b
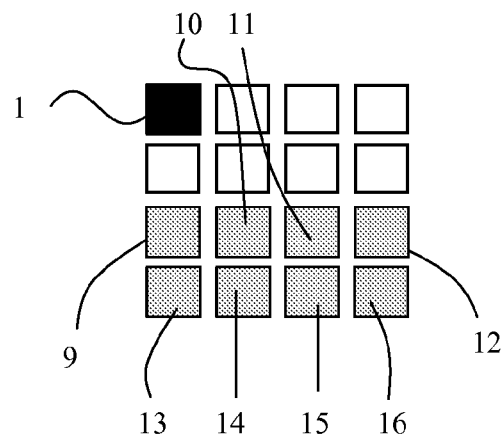
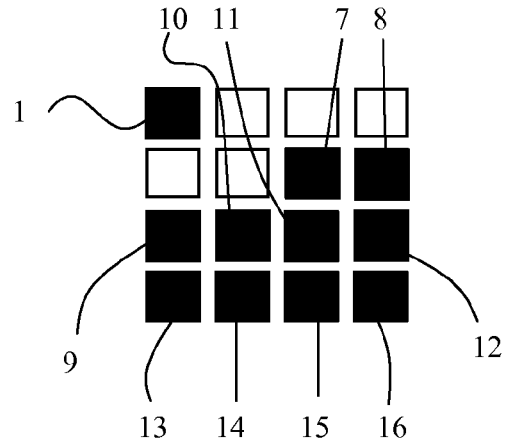
FIG. 3c
FIG. 3d
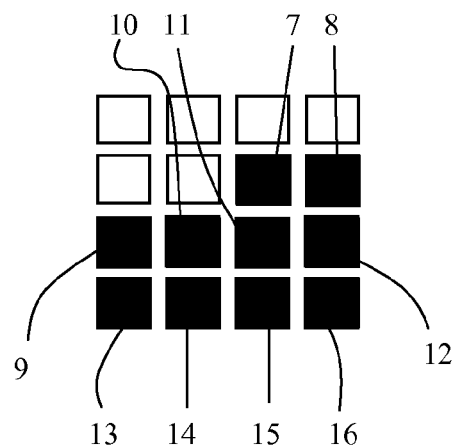
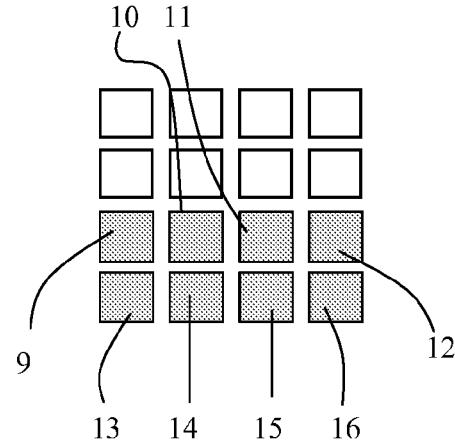
FIG. 3e
FIG. 3f

SYSTEM AND METHOD FOR MULTI-LEVEL PREEMPTION SCHEDULING IN HIGH PERFORMANCE PROCESSING

BACKGROUND OF THE INVENTION

The present disclosure relates generally to computer systems and, in particular, to systems and methods for scheduling on parallel machines including multi-level preemption."

High performance computing platforms such as mainframe or cluster computers are used for computationally intensive operations. Nearly all mainframes have the ability to run (or host) multiple operating systems and thereby operate not as a single computer but as a number of virtual machines. In this role, a single mainframe can replace dozens or even hundreds of smaller servers, reducing management and administrative costs while providing greatly improved scalability and reliability.

Mainframes or clusters may include many (hundreds or even thousands) of central processing units (CPU's). Each CPU contained in a mainframe or cluster computer shall be referred to herein as a "node." A node, as the term is used herein, is not limited to CPU and may be any microprocessor and could be contained, for example, in a personal computer.

Mainframes or clusters are designed to handle very high volume input and output (I/O) and emphasize throughput computing. Since the mid-1960s, mainframe designs have included several subsidiary computers (called channels or peripheral processors) which manage the I/O devices, leaving the CPU free to deal only with high-speed memory. In addition, clustered machines (that is, a group of computers clustered together) may also allow high volume input and output.

BRIEF SUMMARY OF THE INVENTION

One embodiment of the present invention is directed to a computing system configured to handle preemption events in an environment having jobs with high and low priorities. The system of this embodiment includes a job queue configured to receive job requests from users, the job queue storing the jobs in an order based on the priority of the jobs, and indicating whether a job is a high priority job or a low priority job. The system of this embodiment also includes a plurality of node clusters, each node cluster including a plurality of nodes and a scheduler coupled to the job queue and to the plurality of node clusters and configured to assign jobs from the job queue to the plurality of node clusters. The scheduler is configured to preempt a first low priority job running in a first node cluster with a high priority job that appears in the job queue after the low priority job has started and, in the event that a second low priority job from the job queue may run on a portion of the plurality of nodes in the first node cluster during a remaining processing time for the high priority job, backfill the second low priority job into the portion of the plurality of nodes and, in the event a second high priority job is received in the job queue and may run on the portion of the plurality of nodes, return the second low priority job to the job queue.

Another embodiment of the present invention is directed to a method for managing preemption events in a backfill enabled computing system. The method of this embodiment includes suspending a first low priority job running on one or nodes of a node cluster upon receipt of a first high priority job; running the first high priority job on one or more nodes of the node cluster; selecting a second low priority job from a job queue, the second low priority job having a position in the job queue; running the second low priority job on available nodes of the node cluster while the high priority job is running; receiving a request for a second high priority job; and returning, after receiving the request for the second high priority job, the second low priority job to a job queue in the position in the job queue.

Another embodiment of the present invention is directed to a method of managing the operation of computing system including a plurality of node clusters, each node cluster including a plurality of nodes. The method of this embodiment includes allocating a first low priority job to run on an a first set of the nodes in a first node cluster; running the first low priority job on the first set of nodes; receiving, at a job queue, a first high priority job; suspending the first low priority job; running the first high priority job on a second set of nodes in the first node cluster for a predetermined amount of time; selecting a second low priority job from the job queue; running the second low priority job on a third set of nodes in the first node cluster; receiving a second high priority job on the job queue; returning the second low priority job to the job queue; and running the first low priority job after the first and second high priority jobs are complete.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is an example of a job queue that may be utilized by embodiments of the present invention;

FIGS. 3A-3f show node usage in a node cluster as various jobs are received and run;

The detailed description explains the preferred embodiments of the invention, together with advantages and features, by way of example with reference to the drawings.

DETAILED DESCRIPTION OF THE INVENTION

Aspects of the present invention are directed to systems and methods which take into account multiple preemption events. In some embodiments, the invention adjusts to changing backfill window conditions caused by multiple preemption events and canceling low priority jobs which may have advantageously backfilled into the system due to past high priority work. That is, a backfilled job that is low priority, if it needs to be preempted by a high priority job, will be returned to the job queue in its original location. Operating in this manner preserves the intent of classic preemption rules: to allow higher priority jobs to run immediately even if low priority work is presently using them.

In addition, aspects of the present invention prevent previously preempted low priority work from excessive restart delays due to low priority backfill in the event of high priority preemption. As a further advantage high system utilization is preserved because low priority work may still be advantageously backfilled in the event of a high priority preemption. Systems and methods according to the present invention subject low priority backfill to rules that prevents the problems experienced in the current backfill and preemption implementations.

Figure 1:
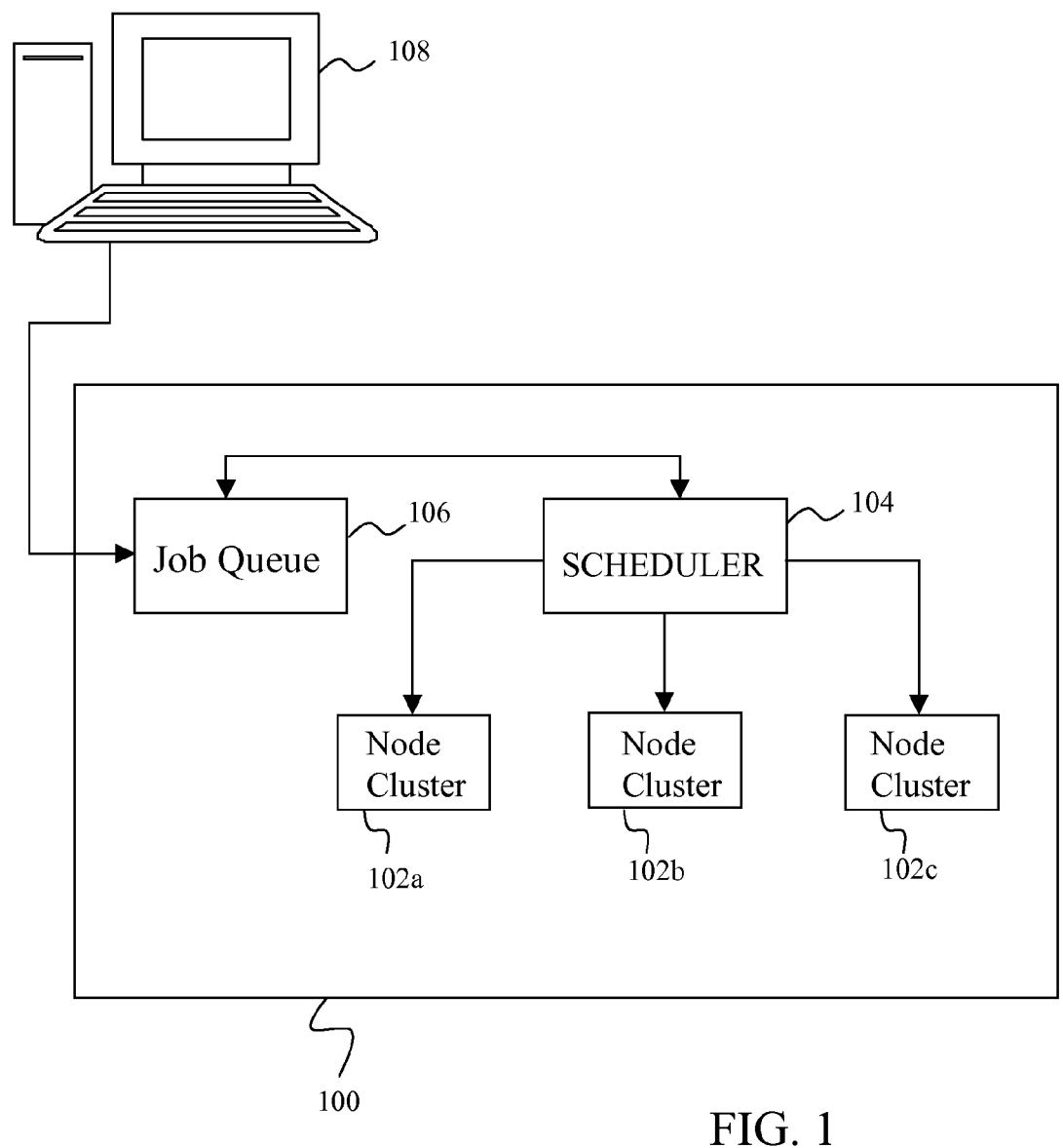
FIG. 1 is an example of a computing system according to an embodiment of the present invention.

FIG. 1 shows an example of a computing system 100 according to an embodiment of the present invention. The computing system 100 may be any type of computing system and may be, for example, a mainframe computer or a personal computer. In some embodiments, the computing system 100 includes a plurality of node clusters 102. For instance, and as shown in FIG. 1, the computing system 100 includes node clusters 102A, 102B . . . 102N. Each of the node clusters 102 may include a plurality of processing nodes therein. In one embodiment each node cluster 102 includes 16 nodes. It should be understood that the number of nodes per cluster and the number of nodes clusters themselves is not limited in any manner. The term "node" as used herein shall refer to an element capable of processing a job either independently or in combination with other nodes. Examples of nodes include, but are not limited to, microprocessors, integrated circuits, and the like. In some embodiments, a node cluster may be a cluster of personal computers where the each personal computer may include one or more processing nodes.

Each of the node clusters 102 may be coupled to a scheduler 104. The scheduler 104 may, in some embodiments, be a parallel job scheduler such as a Tivoli Workload Scheduler Loadleveler from IBM. In general, the scheduler 104 determines how to distribute the jobs contained in a job queue 106 amongst the node clusters 102 in order to efficiently utilize the resources of the computing system 100. The computing system 100 receives jobs to be performed from a system user 108 and these jobs are placed in the job queue 106 in the order they are received. Of course, more than one system users 108 could be connected to the computing system 100. The job queue 106 and the operation of the scheduler 104 are described in greater detail below.

Figure 2:
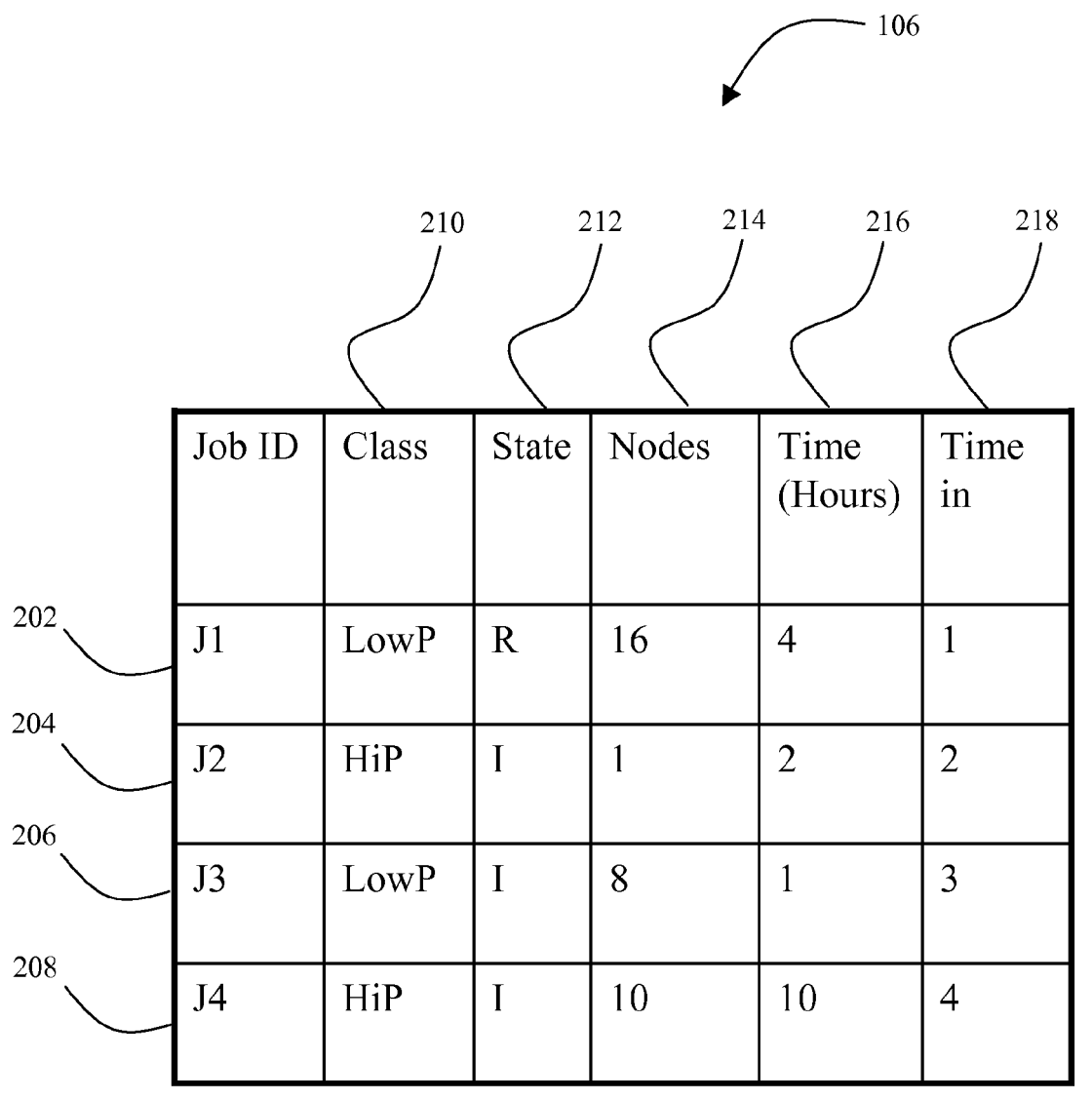

FIG. 2 shows an example of a job queue 106. The job queue 106 includes, in this example, four jobs, 202 (referred to as Job 1 or J1), 204 (referred to as Job 2 or J2), 206 (referred to as Job 3 or J3), and 208 (referred to as Job 4 or J4). Each of these jobs includes a priority rating contained in a priority rating (or class) column 210. For instance, J1 has a LowP (low priority) rating, J2 has a HiP (high priority) rating, J3 has a LowP rating and J4 has a HiP rating.

According to classic preemption rules, a HiP job will always preempt a LowP job. That is, even if a HiP job is received from a user after a LowP job, the computing system will halt (suspend) the LowP job and run the HiP job if there are not enough nodes to process both jobs simultaneously. In such a case, the LowP is suspended and put on hold until the nodes it was running on become available (i.e., after the HiP job finishes). Such a preemption rule may be established in the configuration files of the scheduler. As one of skill in the art will realize, different configurations could exist but the following discussion that the above preemption rule is applied.

The job queue 106 may also include a state column 212 indicating whether a job is running (R) or idle (I). The job queue 106 may also include a nodes required column 214. The values in the node required column 214 represents the number of nodes (or processors) in a node cluster that will be needed for a particular process to run. The job queue 106 may also include a time required column 216 indicating how long the job will take to run and a time in column 218 that represents a time that a particular job was submitted to the queue. As shown, the time in column 218 is just an ordered list for ease of explanation but any type of representation of the time a job came in may be utilized. Alternatively, the time in column 218 could represent an order that jobs are to be completed or any other type of ordering for jobs to be completed.

It should be understood that the job queue 106 shown in FIG. 2 is by way of example only. The job queue may have the same or different columns than those shown in FIG. 2. The only column that may be needed is one that indicates the priority of a particular job. Of course, this information could be in any form and need not necessarily exist in a column as long as it is otherwise associated with a particular job. In general, the job queue is utilized by the scheduler 104 (FIG. 1) to schedule the processing of jobs to be run by the system.

FIGS. 3A-3f show the usage of particular nodes in a single node cluster. As depicted, the node cluster includes 16 nodes. Of course, the node cluster could include any number of node clusters. The description of FIGS. 3A-3f below describes the utilization of particular nodes during operation of a computing system that may accept jobs having HiP and LowP and references jobs having attributes as shown in FIG. 2. In particular, jobs 1-4 from FIG. 2 are referenced in the following description. In FIGS. 3A-3f a node with no shading is idle and shaded node is processing a job. Furthermore, a black shaded node is running a HiP job and a grey shaded node is running a LowP job.

FIG. 3A shows an example of Job 1 running in a 16 node system. Each node 301 is shown in grey meaning that it is being utilized by a LowP job. Consulting again FIG. 2, Job 1 is rated as a LowP job and its state is running (R). Further, Job 1 is utilizing 16 nodes and has an estimated run time of four hours. Job 2 is a HiP job and come in after Job 1 and requires 1 node. According to classic preemption rules, Job 2 preempts Job 1 and the nodes take on the state shown in FIG. 3B. That is, Job 1 is not running (suspended) and Job 2 is running on 1 node, node 1 leaving 15 nodes unutilized.

The scheduler attempts to achieve maximal efficiency and, therefore, maximal usage of the nodes. As shown in FIG. 3B the condition of 15 unused nodes is not consistent with such an operating procedure. Thus, the scheduler attempts to utilize the unused nodes for another process. One way in which this may be done is to backfill the unused nodes with another job from the job queue 106. Examining the job queue 106 shown in FIG. 2, it can be seen that the Job 3 will require 8 nodes and may run in one hour. Assuming that Job 3 comes in at a time less than or equal to one after hour Job 2 has begun, Job 3 could be run on eight of the 15 available nodes and complete before Job 2 does. Alternatively, if J2 and J3 were placed on the queue simultaneously (where J1 was already running on the machine), in the order indicated in FIG. 2, J3 can be started as a backfill event. Because J2 will take 2 hours to complete, the 15 free nodes are available for 2 hours. Since J3 will complete in 1 hour, it is well within the backfill window. As time progresses, this backfill window will become shorter. As long as J3 is started when the backfill window is 1 hour (or greater), J3 runs as a backfill job with no impact on either J2 or the planned restart of suspended job J1. In such a situation, Job 1 would then be able to restart when Job 2 completed and the standard procedure of having HiP jobs preempt LowP jobs would be met with the added benefit that Job 3 also was completed.

FIG. 3C shows HiP job Job 2 running on node 1 and the backfill job Job 3 running on nodes 9-16. Having Job 3 run in the time available nodes while Job 2 was running is referred to herein as "backfilling" and any job so running is referred to herein as a "backfill job." Backfill jobs run in what are referred to herein as "backfill windows" which represent a period of time that a certain number of nodes may be available to receive a backfill job. The backfill window may have two dimensions, a temporal dimension representing the amount of time the nodes will be available and a physical dimension representing the number of available nodes.

As shown in FIG. 3D, assume that a new HiP job Job 4 is submitted a few minutes after Jobs 1-3 and requires 10 nodes for 10 hours. Job 4 preempts Job 3 and runs on ten of the free nodes (nodes 7-16) while Job 2 is processing. The reason that Job 4 preempts Job 3 is there are only 7 free nodes and Job 4 requires 10 nodes, thus, in order for Job 4 to run as soon as possible it needs to preempt Job 3. At this time a so called multi-layer preemption event has occurred. In particular, Job 1 was preempted by Job 2 and Job 3 was preempted by Job 4. In order for Job 1 to resume it must wait for all the high priority jobs Job 2 and Job 4 to complete and, under certain conditions, for J3 to complete as well.

FIG. 3E shows the state of the nodes after Job 2 finishes, thus, closing the original backfill window that allowed Job 3 to start. Job 3 remains suspended because of Job 4. Because Job 2 now finishes the backfill window that allowed J3 to start is now void. Given the current machine state, Job 3 would not be able to backfill since there are six free nodes available for the remainder of the run time of Job 4. In ten hours Job 4 finishes and Job 3 restarts from suspension. This restart blocks the restart of Job 1 until Job 3 completes. The restart of Job 3 is based on the backfill window established when the high priority job, Job 2, ran. Job 1 finally gets to run after all of Jobs 1-3 are completed. FIG. 3f shows Job 3 running and, as discussed above, Job 1 will not be restarted until Job 3 is completed.

As can be seen from this brief example, in the case where multiple preemptions occur in systems where backfilling is allowed, situations could exist where Job 1 never gets completed. Aspects of the present invention may ensure that this will not happen.

Figure 4:
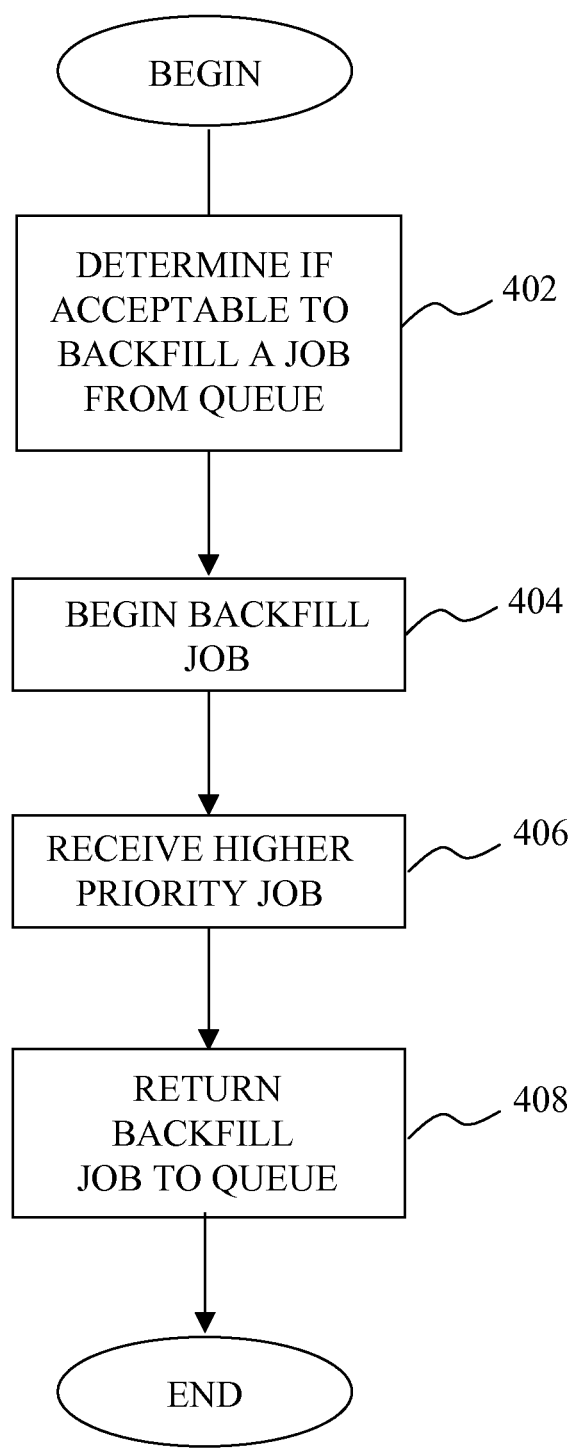
FIG. 4 shows a high level block diagram of one method according to an embodiment of the present invention.

FIG. 4 shows an example of a method by which aspects of the present invention may be implemented. This method may be implemented in the scheduler 104 (FIG. 1) or in any other location in the computer system that has access to allocation of jobs to the nodes contained therein. At a block 402 it is determined if it is acceptable to backfill a job from a job queue. If so, at a block 404 the backfill job is started. That is, as is described above, the job may be placed on nodes that are currently idle, yet protected by a backfill window as the result of a high priority job preempting a previously running low priority job.

At a block 406 a higher priority job is received and causes, at a block 408, the backfill job to be returned to the queue in the location it originally had. Returning the backfill job to the job queue at block 408 accomplishes the goal of ensuring that low priority backfill jobs do not end up taking on a higher priority than previously started low priority jobs. In this manner the present invention helps alleviate the problems associated with backfilling that may exist when multilevel preemption events occur.

Figure 5:
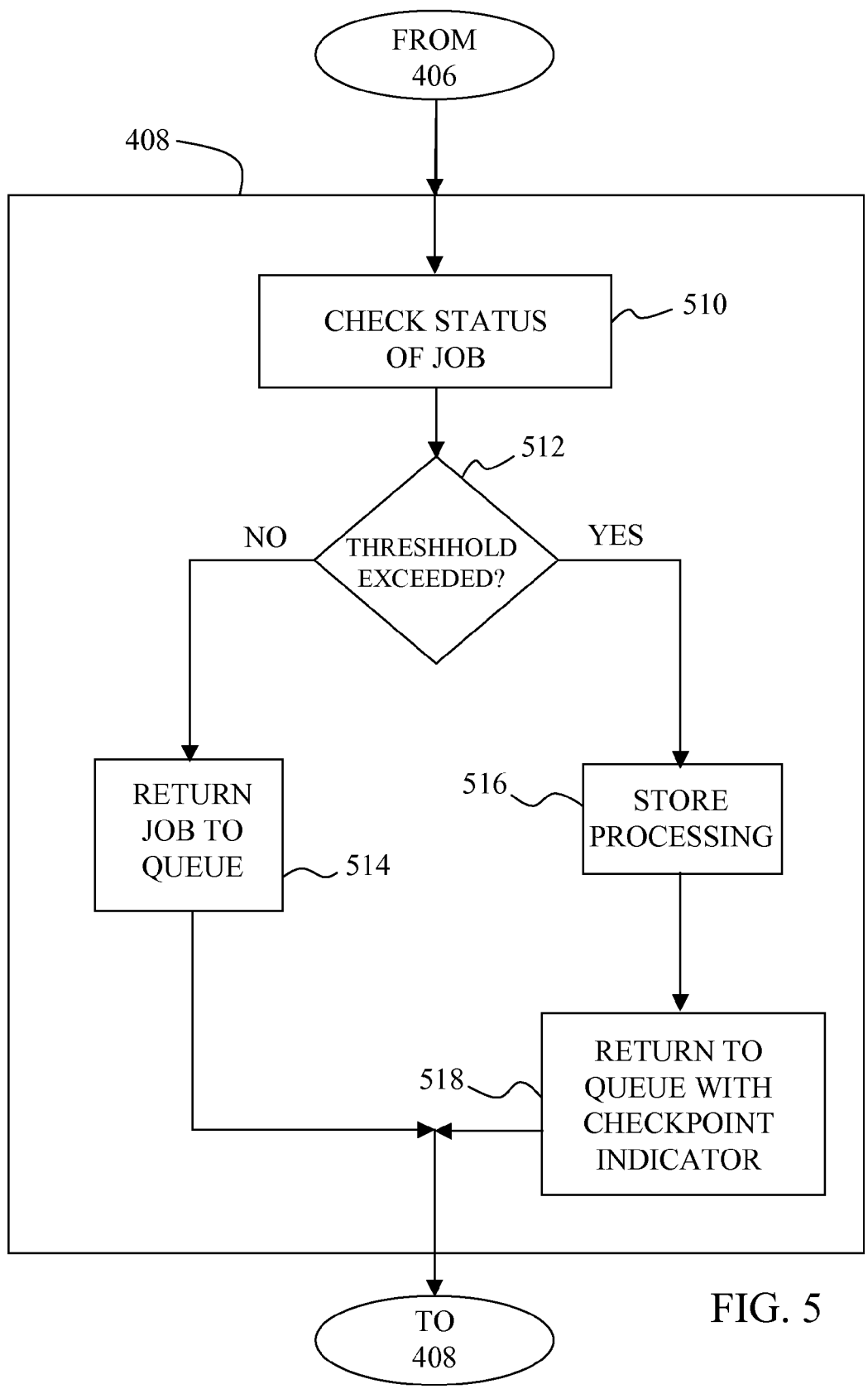
FIG. 5 shows a more detailed block diagram of a process that may be performed in one block of the block diagram shown in FIG. 4.

FIG. 5 shows a more detailed depiction of the process of block 408 of FIG. 4 where a backfill job is returned to the job queue. It should be understood that the process shown in FIG. 5 is optional. In the event that the process of FIG. 5 is not implemented the backfill job is merely replaced in the job queue when a HiP job preempts it.

The process begins at a block 510 where the status of the backfill job is checked. It is then determined, at a block 510, whether a particular processing threshold has been exceeded. This threshold is based on how much of the backfill job has been completed. In some instances it may be advantageous to store all of the processing that has been performed on the backfill job in a storage location (available disk space or memory) so that when the job is restarted this information may be retrieved. Of course, in certain instances the job may not have progressed far enough such that the amount of time taken to store the information and then recall when the backfill job restarts results in any advantage. That is, it may take longer to "checkpoint" the job than to just restart it when the job reappears at the top of the job queue. The threshold that is checked may be a time running or amount of processing completed and is configurable by a user of the system.

If the threshold has not been exceeded, processing progresses to a block 514 where the backfill job is returned to the job queue. If the threshold has been exceeded processing progresses to a block 516 where the processing that has been performed on the job is stored. After the processing of the backfill job has been stored, at a block 518, the job is returned to the job queue and, in some instances may include an indication of the memory locations where the checkpoint information has been stored.

In some embodiments, certain jobs may not be checkpointable. For instance, in the example above, assume Job 3 is not checkpointable and it has run for a certain portion of its run time. In some embodiments, jobs that are not able to be checkpointed are tagged as such and the system would not save any job state if the job is placed back onto the job queue. In addition, another class of jobs may also impact storage in such a way that, if they are cancelled after a partial run, there would be undesired side effects. Jobs in this category are tagged as not checkpointable, and not able to be backfilled in the case where a preempted backfill window becomes available. These special situations can be handled by flags within the jobs to indicate which different categories the job belongs to.

Figure 6:
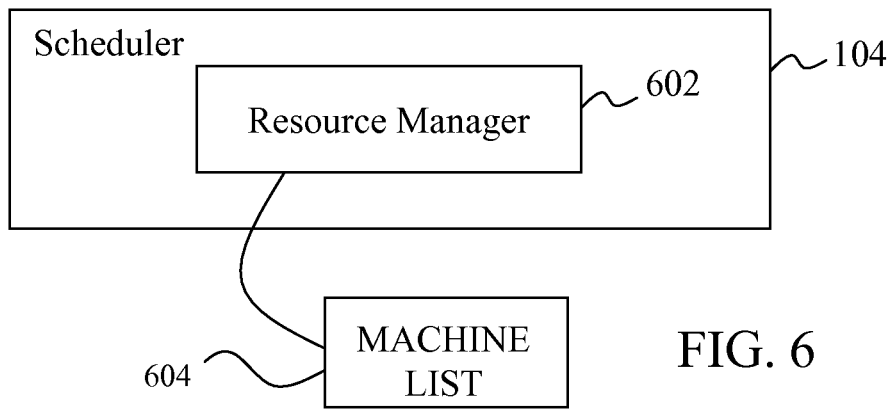
FIG. 6 shows an embodiment of a scheduler according to the present invention.

FIG. 6 shows an example of a scheduler 104 according to an embodiment of the present invention. The scheduler 104 shown in FIG. 6 may include a resource manager 602. The resource manager keeps track of which resources are currently being utilized. For instance, the resource manager may keep a list of machines in the form of a machine list 604 indicating which machines are being used by which jobs and the time requirements associated therewith. For instance, the machine list 604 could include a listing of the node clusters and which nodes within them are being used.

Figure 7:
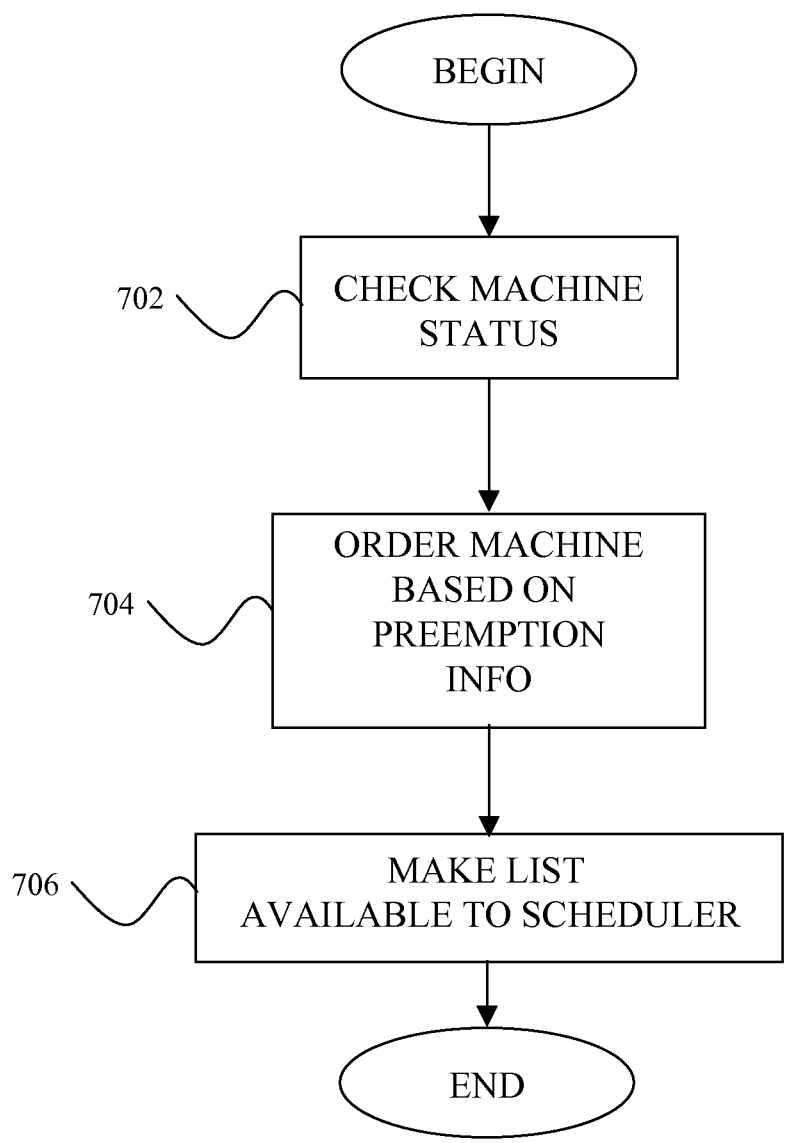
FIG. 7 shows an embodiment of a method for checkpointing a currently running backfill job.

FIG. 7 shows an example of a method that may be performed by the resource manager utilizing the machine list. The process begins at a block 702 where a particular machines status is examined. At a block 704, the machines are ordered based on preemption issues discovered. For instance, a machine (node cluster) that does not have a preemption job will be listed higher than one that does. At a block 706, the list may then be made available to the scheduler. In some embodiments, nodes may be ordered such that free nodes are at the top of the list, busy nodes come next and then preempted nodes are ordered from a lowest to highest level of preemption.

Referring again to FIG. 6, the resource manager may perform the steps shown in FIG. 7 and release the information to the scheduler 104.

Figure 8:
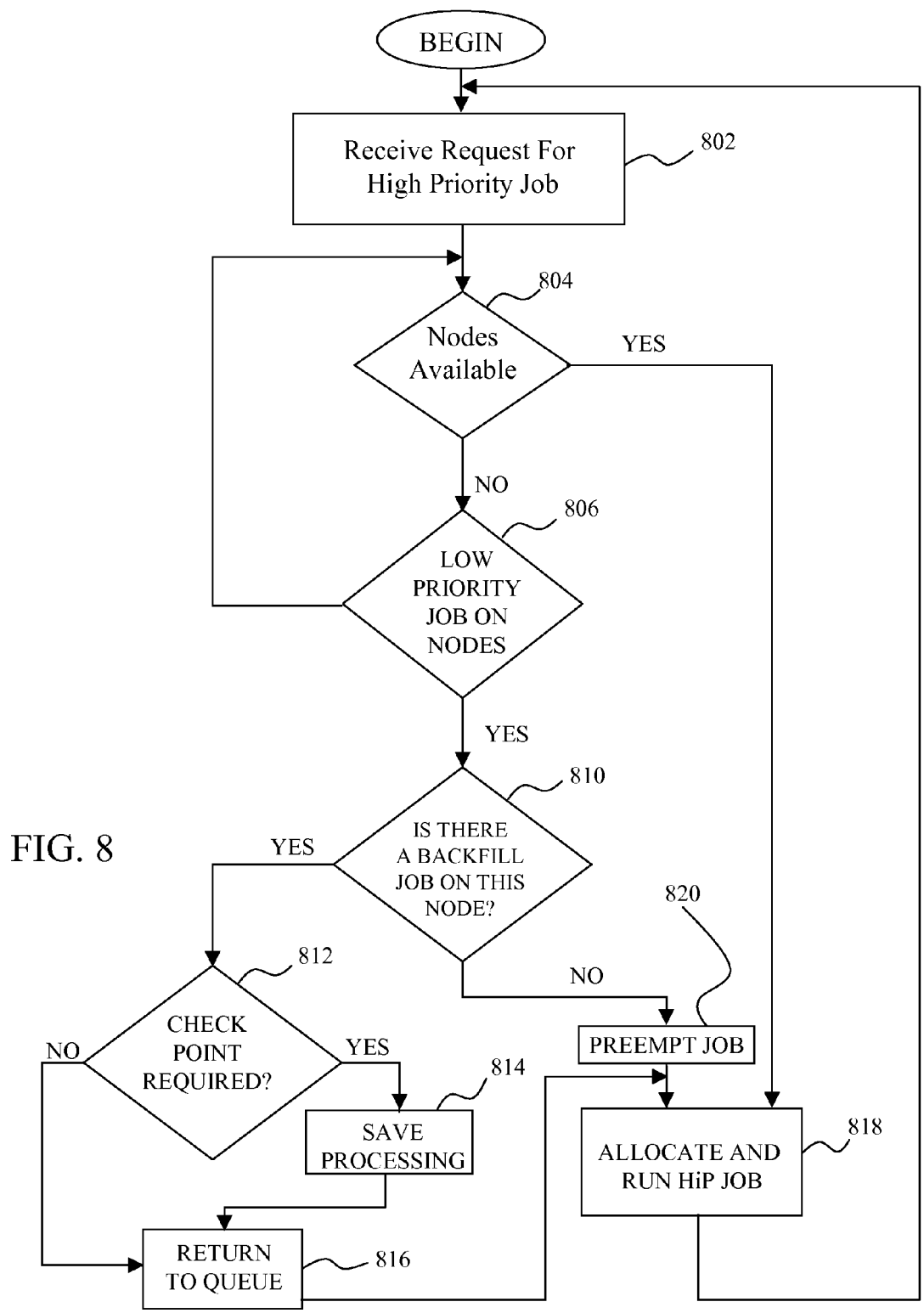
FIG. 8 is a block diagram of a process by which jobs may be allocated and run according to an embodiment of the present invention.

FIG. 8 shows a process by which the scheduler may operate in order to carry out the multi-level preemption according to the present invention. The process shown in FIG. 8 assumes that a machine is currently running with a number of jobs already being processed.

At a block 802 a request for a HiP job is received. At a block 804 it determined if any of the node clusters, considered either alone or in combination, include enough open nodes to run the HiP job. If so, at a block 818 the HiP job has nodes in one of the node clusters allocated for it and it is run. The allocation of nodes may include updating the status of particular nodes within a node cluster in the machine list as described above. If there are no nodes available, or not enough nodes available to run the HiP job, then the node clusters are examined to see if any have LowP jobs running on them that may be preempted at a block 806. The determination made in block 806 may include scanning the machine list which contains the status of the nodes in node clusters of the computing system. It will be understood that a HiP job may run on a combination of free nodes and nodes that previously had LowP job running on them. In other words, to the extent additional nodes beyond available free nodes are needed, those nodes may be made available by preempting LowP jobs.

In the event that no LowP jobs are running that may be preempted, i.e., all of the nodes are running high priority jobs, the current scheduler pass moves to the next job and processing returns to block 804. That is, if a job cannot be scheduled, it is skipped and the scheduler considers other jobs in the list. At the next pass, all idle jobs are again checked to see if they can now run (due to changes in node availability). In the event that there is a LowP job running on a particular node in certain clusters that may be preempted (i.e., the LowP job is utilizing the same or more nodes than are needed by the HiP job), at a block 810 it is determined whether this LowP is a backfill job. In some embodiments, the probability that a node having a backfill job running on it will be selected may be reduced by placing nodes having backfill jobs running on them at the bottom of the machine list and scanning the machine list from top to bottom when searching for nodes having LowP jobs in block 808.

If the LowP job is not a backfill job, at a block 820 the job is preempted. In some instances, preempting the job may cause the node or node cluster the job was running on to be placed at the bottom of the machine list. The HiP job is then allocated and run at a block 818. Of course, as one of skill in the art will realize, multiple LowP jobs may need to be preempted in order to free up the required resources. As such, the process performed in block 820 may involve preempting multiple LowP jobs. If the LowP was a backfill job, a checkpointing routine may be run. That is, if the LowP job is a backfill job as determined at block 810, at a block 812 it is determined if the backfill job should be checkpointed. If so, at a block 814 the processing that has been performed on the backfill job is saved. Regardless of whether checkpointing is required, at a block 816 the backfill job is returned to the job queue. As discussed above, returning the backfill job to the job queue ensures that a LowP backfill job will not, by virtue of being a backfill job, achieve a status that is higher than a LowP job that was previously started but is suspended because it was preempted.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for managing preemption events in a backfill enabled computing system, the method comprising:

suspending a first low priority job running on one or more nodes of a node cluster upon receipt of a first high priority job until the nodes the first low priority job was running on become available;

running the first high priority job on the one or more nodes of the node cluster;

selecting a second low priority job from a job queue, the second low priority job having a position in the job queue;

running the second low priority job on available nodes of the node cluster while the first high priority job is running;

receiving a request for a second high priority job after the second low priority job has started running;

determining a processing status for the second low priority job;

determining that the processing status of the second low priority job exceeds a predetermined checkpoint threshold;

saving processing performed on the second low priority job in the event the processing status exceeds the predetermined checkpoint threshold;

returning, after receiving the request for the second high priority job, the second low priority job to a job queue in the position in the job queue; and running the first low priority job and the second low priority job after the first high priority job and the second high priority job are complete.

2. The method of claim 1, further comprising:

running the second high priority job on available nodes of the node cluster.

3. The method of claim 1, wherein the predetermined checkpoint threshold is an indication of the portion of the total process performed on the second low priority job.

4. A method of managing the operation of computing system including a plurality of node clusters, each node cluster including a plurality of nodes, the method comprising:

allocating a first low priority job to run on an a first set of the nodes in a first node cluster;

running the first low priority job on the first set of nodes;

receiving, at a job queue, a first high priority job;

suspending the first low priority job until the first set of nodes becomes available;

running the first high priority job on a second set of nodes that includes at least one of the nodes in the first set of nodes in the first node cluster for a predetermined amount of time;

selecting a second low priority job from the job queue;

running the second low priority job on a third set of nodes in the first node cluster;

receiving a second high priority job on the job queue after the second low priority job has started running;

determining a processing status for the second low priority job;

determining that the processing status of the second low priority job exceeds a predetermined checkpoint threshold;

saving processing performed on the second low priority job in the event the processing status exceeds the predetermined checkpoint threshold;

returning the second low priority job to the job queue; and running the first low priority job and the second low priority job after the first high priority job and second high priority job are complete.

5. The method of claim 4, wherein selecting the second low priority job includes determining a completion time for the second low priority job and determining a number of nodes required to run the second low priority job.

6. The method of claim 5, wherein determining includes determining that the completion time is shorter than a time remaining to complete the first high priority job.

7. The method of claim 6, wherein determining includes determining that the number of nodes required is less than a difference between a total number of nodes in the plurality of nodes and a number of nodes in the second set of nodes.

* * * * *